N. JÚHÁSZ.
STREET CAR FENDER.
APPLICATION FILED JULY 23, 1909.
944,267.
Patented Dec. 28, 1909.
2 SHEETS—SHEET 1.
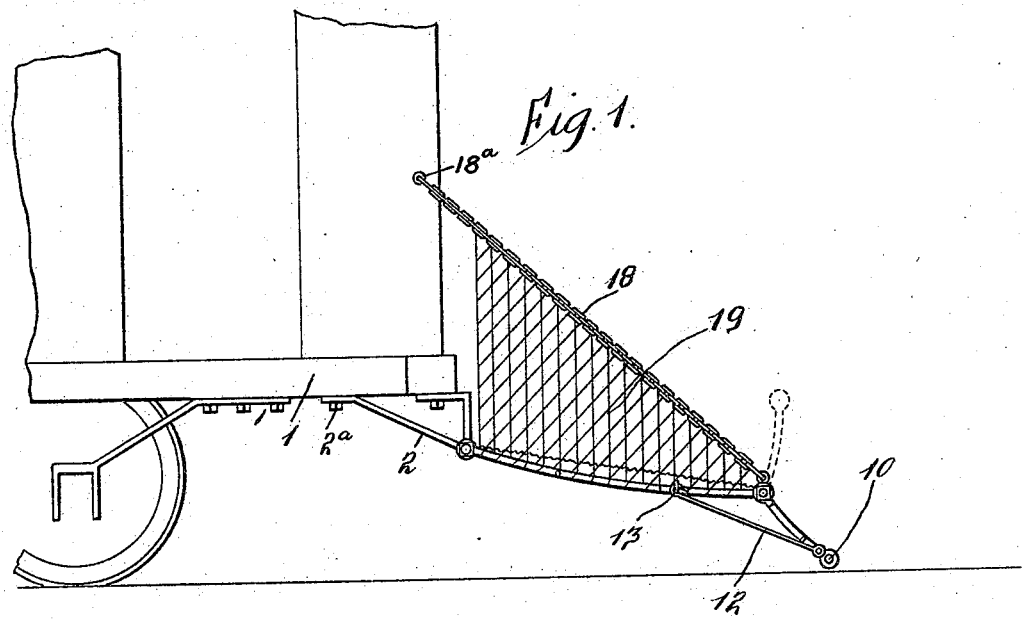
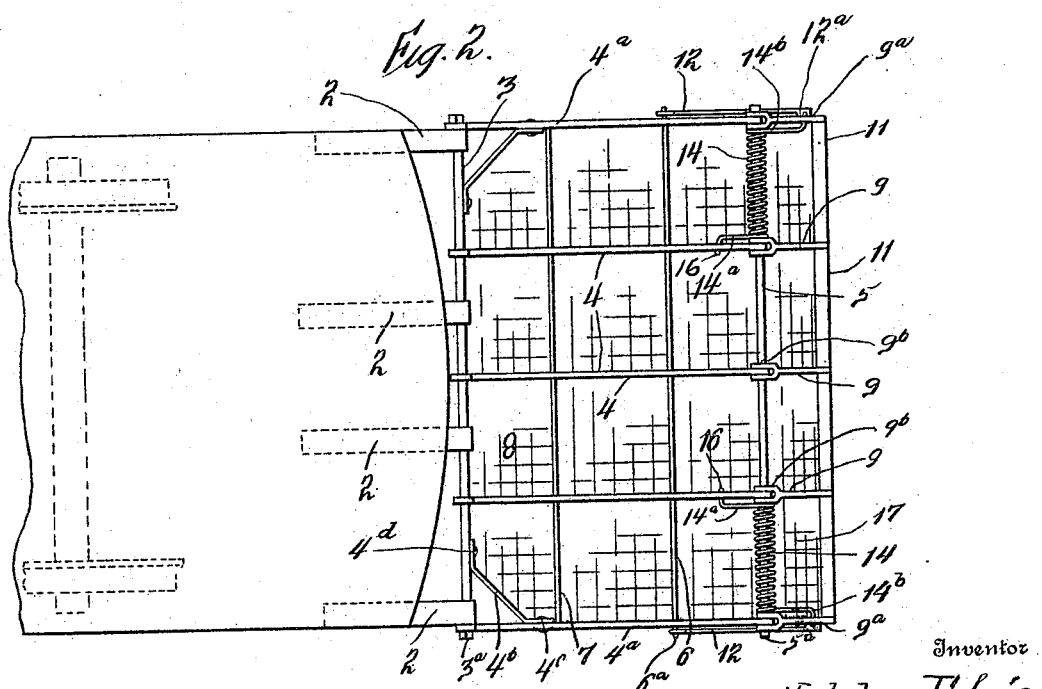
Witnesses
A. H. Rabsúg,
R. H. Butler
Inventor
Nicholas Júhász
By N. C. Everth
Attorneys N. JÚHÁSZ.
STREET CAR FENDER.
APPLICATION FILED JULY 23, 1909.
944,267.
Patented Dec. 28, 1909.
2 SHEETS—SHEET 2.
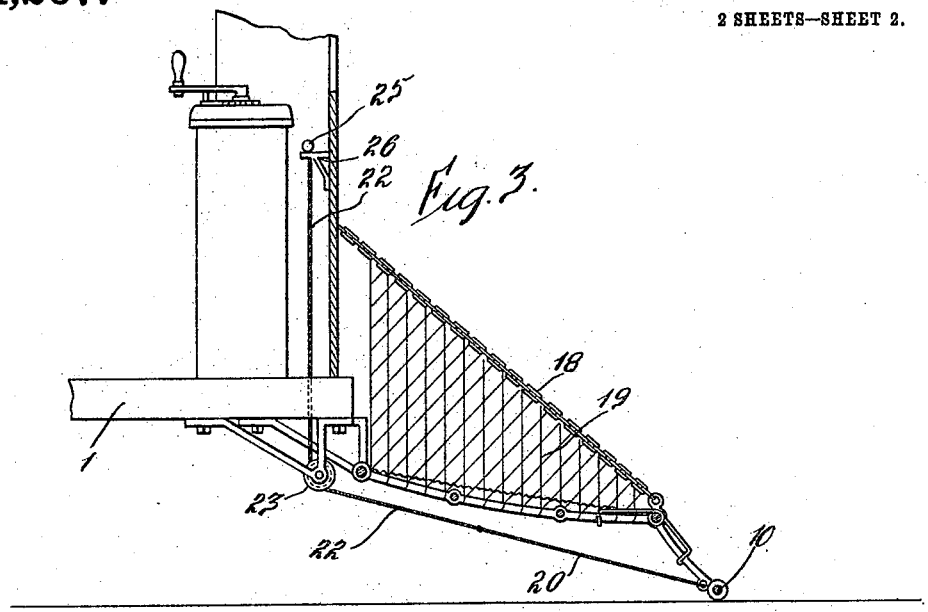
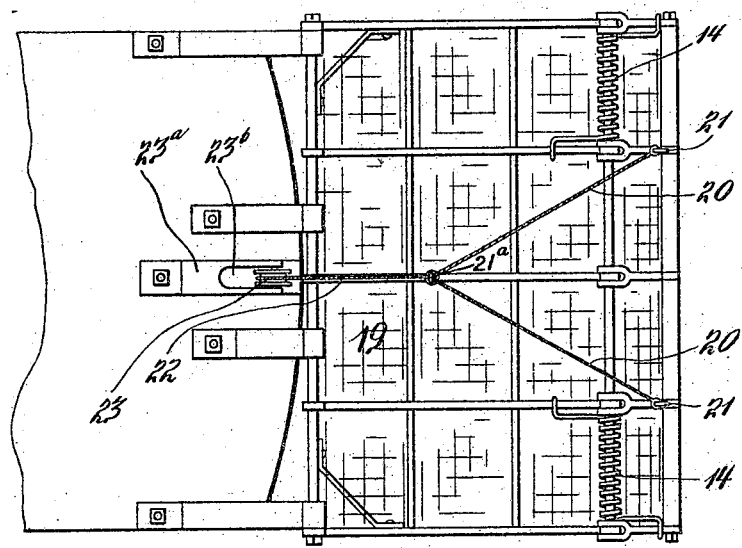
Witnesses
A. H. Rabsag
R. H. Butler
Inventor
Nicholas Juhász
By H. C. Evert & Co.
Attorneys

UNITED STATES PATENT OFFICE.

NICHOLAS JÚHÁSZ, OF SOUTH BEND, INDIANA.

STREET-CAR FENDER.

944,267.  Specification of Letters Patent.  Patented Dec. 28, 1909.

Application filed July 23, 1909. Serial No. 509,197.

*To all whom it may concern:*

Be it known that I, NICHOLAS JÚHÁSZ, a subject of the King of Hungary, residing at South Bend, in the county of St. Joseph and State of Indiana, have invented certain new and useful Improvements in Street-Car Fenders, of which the following is a specification, reference being had therein to the accompanying drawing.

This invention relates to attachments for car fenders and the object thereof is to provide in a manner as hereinafter set forth an attachment carried by the lower end of a car fender and which when it strikes a pedestrian is adapted to throw the pedestrian into the fender thereby preventing the possibility of the fender riding over the pedestrian so that he would be struck by the body of the car or the car wheels and under such conditions reducing to a minimum the injuring or maiming of the pedestrian.

Further objects of the invention are to provide an attachment for car fenders which shall be simple in its construction and arrangement, strong, durable, efficient in its use, readily set up with respect to the fender, quickly operated, and inexpensive to manufacture.

With the foregoing and other objects in view the invention consists in the novel construction, combination and arrangement of parts hereinafter more specifically described and illustrated in the accompanying drawings, wherein is shown the preferred embodiment of the invention, and it is to be understood that changes, variations, and modifications can be resorted to which come within the scope of the claims hereunto appended.

In the drawings, wherein like reference characters denote corresponding parts throughout the several views, Figure 1 is a side elevation of an attachment for car fenders in accordance with this invention, and showing the adaptation of the attachment in connection with a fender, Fig. 2 is a top plan with a portion of the fender removed, Fig. 3 is a side elevation of a modified form, showing the adaptation thereof with respect to a car fender, and Fig. 4 is a top plan of Fig. 3 with a portion of the fender removed.

Referring to Figs. 1 and 2 of the drawings, 1 denotes a platform of a car provided at its forward end with depending brackets 2, these latter being secured to the lower face of the platform 1 through the medium of the hold-fast devices $2^a$. The brackets 2 project forwardly of the plane of the forward edge of the platform 1. Journaled in the brackets 2 is a transversely-extending shaft 3 which is of a length to project from each outermost bracket 2 as at $3^a$. Mounted upon the shaft 3 and projecting forwardly therefrom are the arms 4 and $4^a$, the arms $4^a$ being positioned upon the projecting ends $3^a$ of the shaft 3. The arms 4 and $4^a$ are fixedly-secured to the shaft 3, and braces $4^b$ further couple the arms $4^a$ with the shaft 3. In this connection it will be stated, that the braces $4^b$ are provided with angular ends $4^c$ which engage the arms $4^a$ and are secured thereto by suitable hold-fast devices and the said braces $4^b$ are furthermore provided with angular ends $4^d$ which are secured by suitable hold-fast devices to the shaft 3. The arms 4 and $4^a$ are braced through the medium of a pair of transversely-extending rods 6 and 7, the ends of the rods being suitably secured to the arms $4^a$ and the ends of the rod 6 are not only secured to the arms $4^a$ but project from each of said arms for a purpose to be hereinafter referred to, the projecting ends of the rod 6 being indicated by the reference character $6^a$. The rods 6 and 7 are connected to the arms 4 and $4^a$ at points intermediate the ends of the said arms. The forward ends of the arms 4 and $4^a$ have mounted therein a transversely-extending rock shaft 5 which is of such a length as to project from each of the arms $4^a$, the projecting ends of the rock shaft 5 being indicated by the reference character $5^a$.

Mounted upon the shaft 5 is a series of short arms 9 and $9^a$, each of the short arms 9 and $9^a$ is bifurcated at its upper end as at $9^b$ and furthermore straddles the forward ends of the arms 4 and $4^a$ as clearly shown in Fig. 2. The forward ends of the arms 9 and $9^a$ are connected together by a bearing rod 10 upon which is journaled a series of rollers 11 which are adapted to travel upon the track bed over which the car moves. The arms $9^a$ are mounted upon the projecting ends $5^a$ of the shaft 5.

The fender which consists of the elements 3, 4, $4^a$, 5, 6, and 7, and also a netting 8 which is connected to such elements extends forwardly at an inclination, and the attachment or lifting frame which comprises the elements 9, $9^a$, 10, and 11, and also element 5 extends also forwardly at an inclination and at a greater inclination than the fender.

To the elements of the attachment set forth a netting 17 is secured.

The attachment which is carried by the forward end of the fender, not only comprises the elements set forth herein, but furthermore comprises a pair of coil springs 14, one end $14^a$ of each of said springs having an angular bend as at 16, which engages under arm 4 of the fender and the other end $14^b$ of each of said springs is provided with an angular terminus which engages under bar $9^a$. The tendency of the springs 14 is to normally maintain the attachment in an elevated position, but to overcome such tendency and to maintain the attachment in an operative position, which is, a position that will enable the rollers 11 to travel upon the track bed, a pair of hooks are provided; these hooks are indicated by the reference character 12 and are pivoted to the arms $9^a$ as at $12^a$ and engage the projecting end $6^a$ of the shaft 6 as clearly shown in Fig. 1 and as at 13.

As shown in Fig. 1 each side of the fender is provided with a netting 19 projecting upwardly from the fender and connected to a cable 18 which is attached to the car body as at $18^a$.

From the foregoing construction and arrangement of parts it is evident that if the fender and the attachment be in the position in full lines shown in Fig. 1, that should the attachment strike a person, the weight of the person would tend to lower the attachment, which would cause the bolts 12 to become detached from the ends $6^a$ of the shaft 6 and the action of the springs 14 would elevate the attachment to the position shown in dotted lines and throw the person into the fender, consequently there would be less liability of the person becoming injured than if the attachment were not employed.

Referring to Figs. 3 and 4 of the drawings, in which a modified form is shown, the hooks 12 are dispensed with, the release of the attachment being had manually through the medium of the motorman and a pair of branch cables 20 are provided which are connected to two of the arms 9 as at 21; the cables are connected as at $21^a$ to a main cable 22 passing around the sheave 23 journaled in the bracket $23^a$, carried by the platform 1. The cable extends pivotally through an opening $23^b$ and on its upper end is provided with a knob 25, detachably held by a bracket 26. When a motorman observes that the attachment is about to contact with a person, he removes the knob 25 from the bracket 26, which releases the attachment and the latter will throw the person into the fender.

What I claim is:

1. The combination with a car fender, of a lifting frame including normally inclined arms having their inner ends bifurcated and pivotally connected to the forward end of the fender, a bearing rod connected to the forward end of said arms and forming a part of said lifting frame, rollers mounted upon said bearing rod, springs mounted upon the forward end of the fender and each having a pair of angular ends, one of the angular ends of each of the springs engaging the fender and the other angular end engaging an end of the lifting frame, said springs constituting means for maintaining the lifting frame in an elevated position, and releasable means connected to the ends of the lifting frame and detachably connected to the fender for maintaining the lifting frame in a lower position against the action of said spring.

2. The combination with a car fender, of a lifting frame including normally inclined arms having their inner ends bifurcated and pivotally connected to the forward end of the fender, a bearing rod connected to the forward end of said arms and forming a part of said lifting frame, rollers mounted upon said bearing rod, springs mounted upon the forward end of the fender and each having a pair of angular ends, one of the angular ends of each of the springs engaging the fender and the other angular end engaging an end of the lifting frame, said springs constituting means for maintaining the lifting frame in an elevated position, releasable means connected to the ends of the lifting frame and detachably connected to the fender for maintaining the lifting frame in a lower position against the action of said spring, a netting connected to said frame and fender and extending above the fender, and means connected to the lower face of the lifting frame for shifting it from an elevated to a lowered position.

In testimony whereof I affix my signature in the presence of two witnesses.

NICHOLAS JÚHÁSZ.

Witnesses:
  GEORG NEMETH,
  MICHAEL FORVZS.